(12) United States Patent
Geisler

(10) Patent No.: US 6,290,271 B1
(45) Date of Patent: Sep. 18, 2001

(54) VEHICLE BRUSH AND GRILL GUARD

(75) Inventor: Richard J. Geisler, Oregon City, OR (US)

(73) Assignee: Warn Industries, Inc., Milwaukie, OR (US)

( * ) Notice: Subject to any disclaimer, the term of this patent is extended or adjusted under 35 U.S.C. 154(b) by 0 days.

(21) Appl. No.: 09/570,769

(22) Filed: May 11, 2000

(51) Int. Cl.[7] .................................................. B60R 19/48
(52) U.S. Cl. ............................. 293/115; 293/117; 293/143
(58) Field of Search .................................... 293/115, 143, 293/144, 117; 180/68.6

(56) References Cited

U.S. PATENT DOCUMENTS

| | | |
|---|---|---|
| D. 300,420 | 3/1989 | Trinnaman . |
| D. 361,316 | 8/1995 | Orth, Sr. et al. . |
| D. 416,219 | 11/1999 | Waagenaar . |
| D. 420,962 | 2/2000 | Chevalier . |
| D. 422,952 | 4/2000 | Waagenaar . |
| D. 422,953 | 4/2000 | Waagenaar . |
| 4,043,579 | 8/1977 | Meyer ................................. 293/143 |
| 4,127,295 | 11/1978 | Robinson ........................... 293/117 |
| 4,671,552 | 6/1987 | Anderson . |
| 5,215,343 | 6/1993 | Fortune ............................... 293/121 |
| 5,695,228 | 12/1997 | Storer ................................. 293/115 |
| 6,113,164 | 9/2000 | Setina ................................. 293/142 |

*Primary Examiner*—Joseph D. Pape
*Assistant Examiner*—Patricia Engle
(74) *Attorney, Agent, or Firm*—Robert L. Harrington

(57) ABSTRACT

A vehicle having a brush and grill guard fabricated to blend with the contour of the vehicle so that the design features of the vehicle are not compromised. Frame extensions are mounted to the frame and support a pair of vertical support plates. A winch carrier and winch mounted thereon are optionally mounted to the support plates or directly to the vehicle frame. A fascia configured as a compound curve is fitted to the vertical plates and has a removable cover to hide the winch from view when not in use. An exposed edge of the vertical plates and/or the fascia are provided with a protective and visual enhancing elastomer strip molded to the edge.

14 Claims, 3 Drawing Sheets

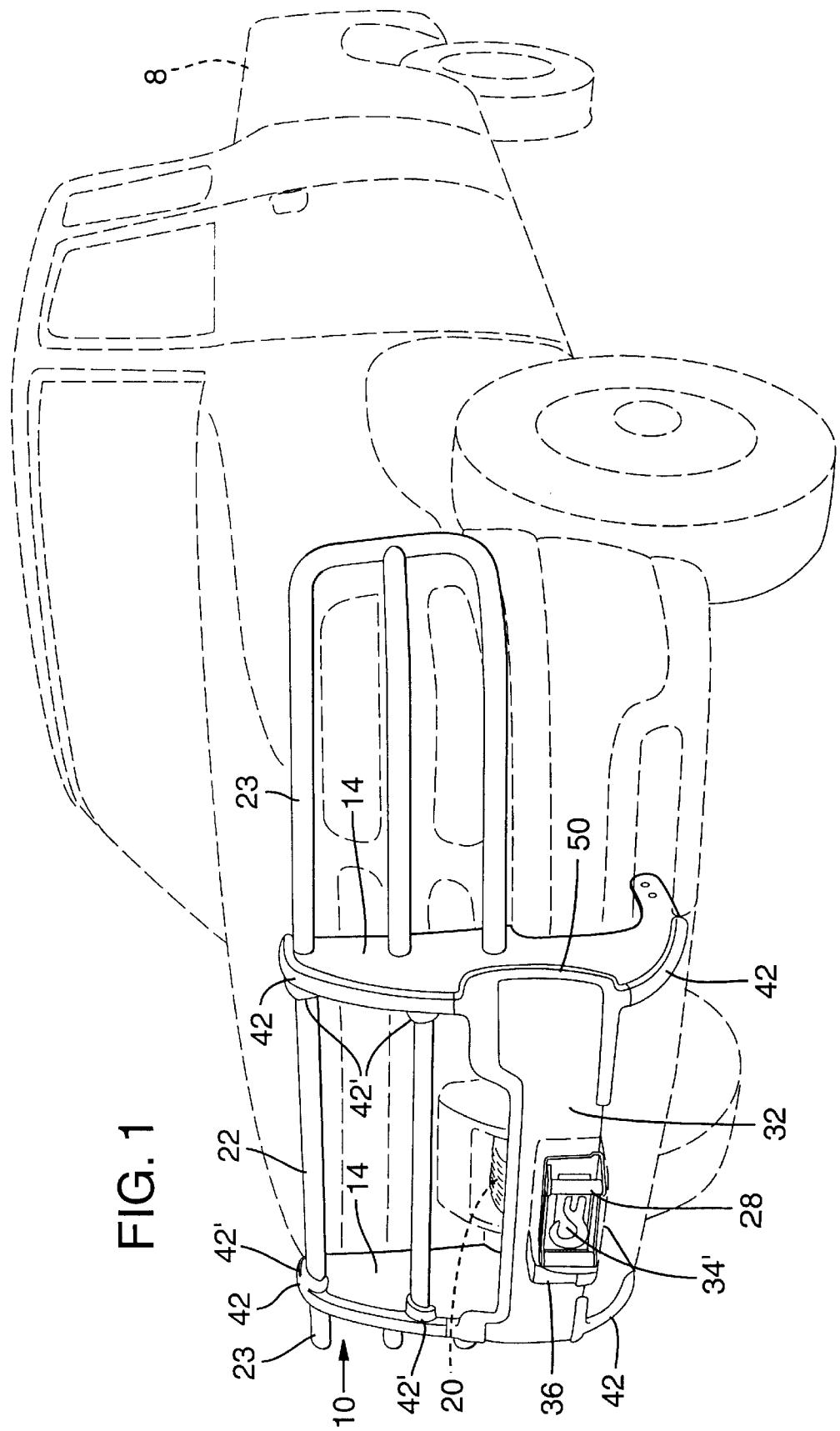

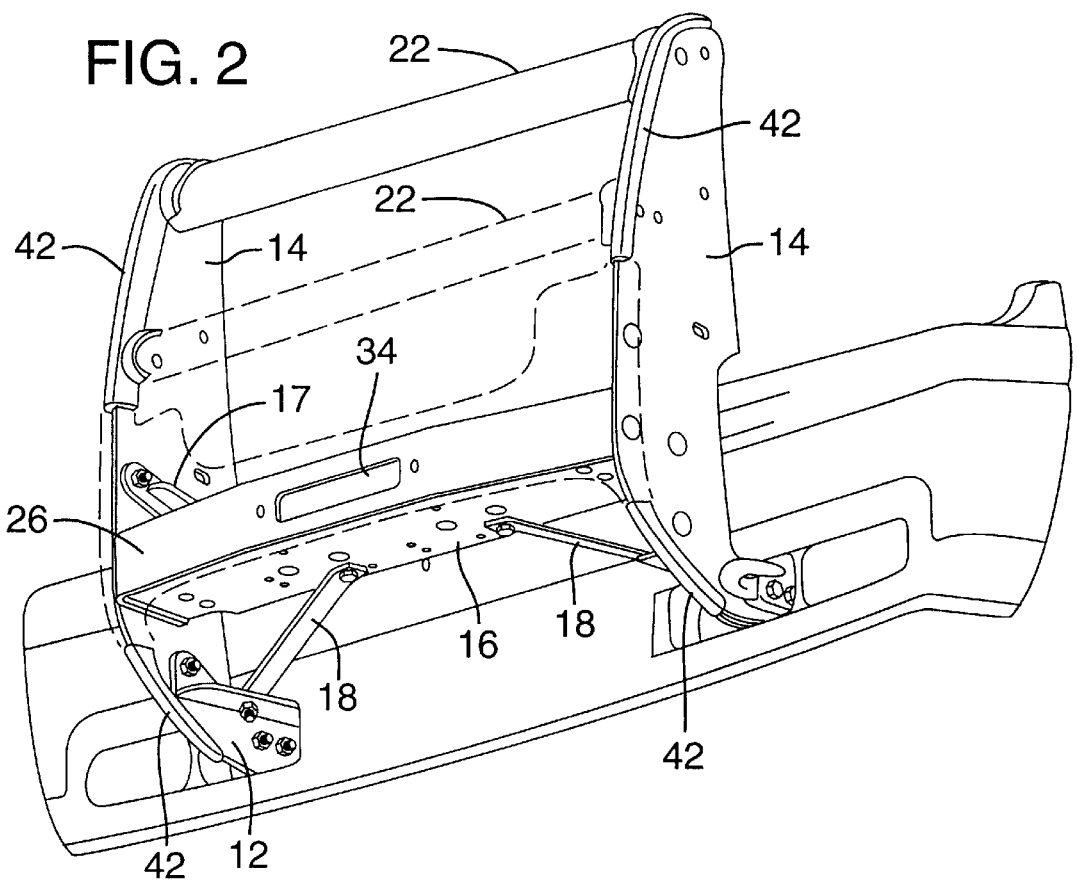
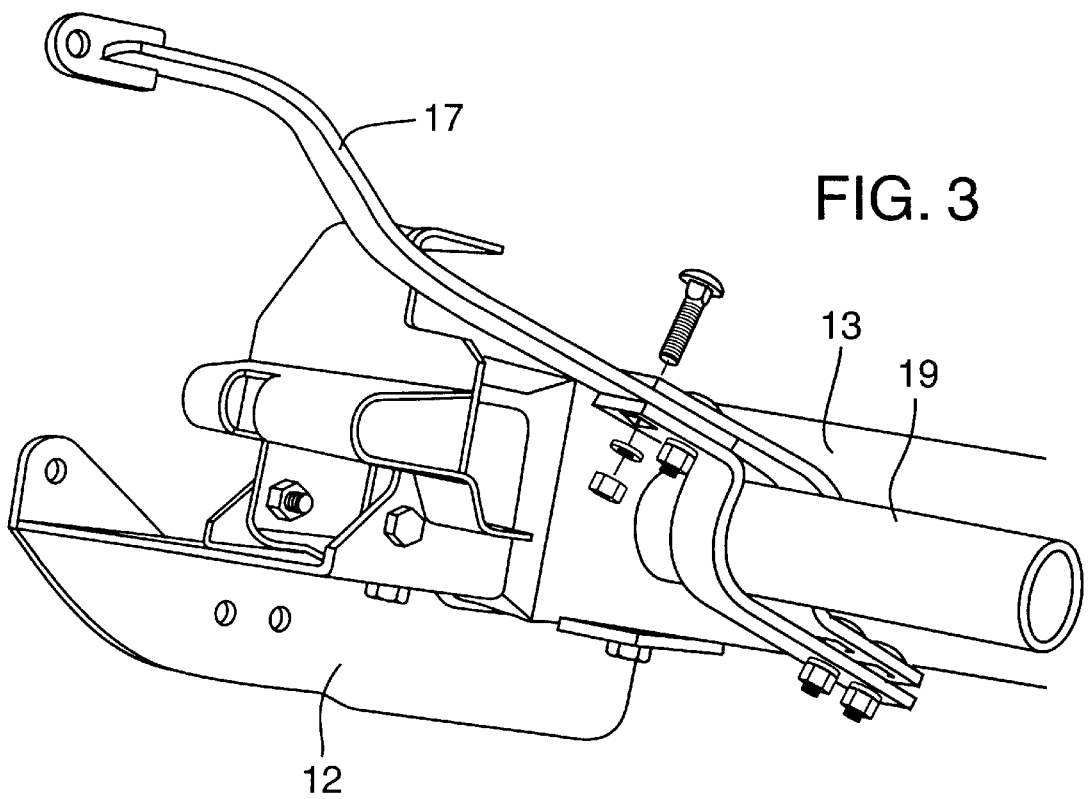

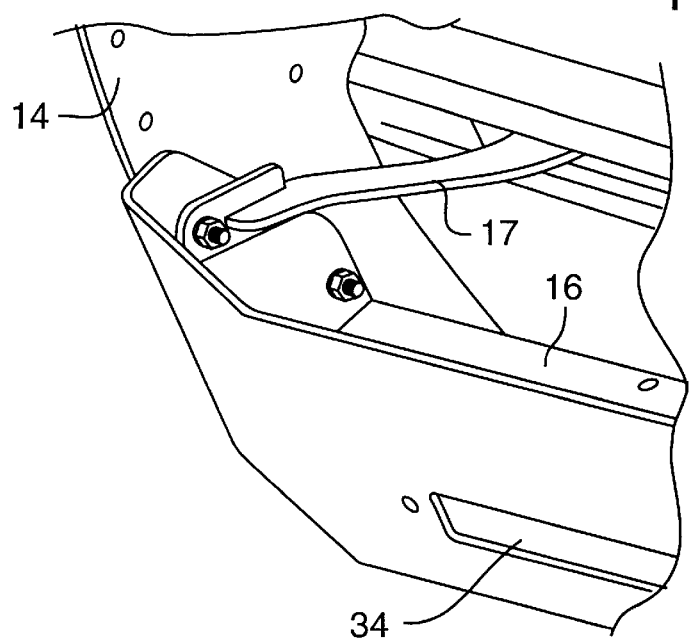
FIG. 4
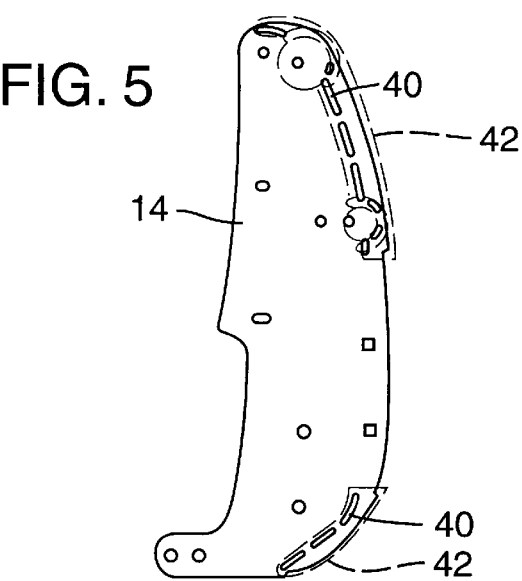
FIG. 5
FIG. 6
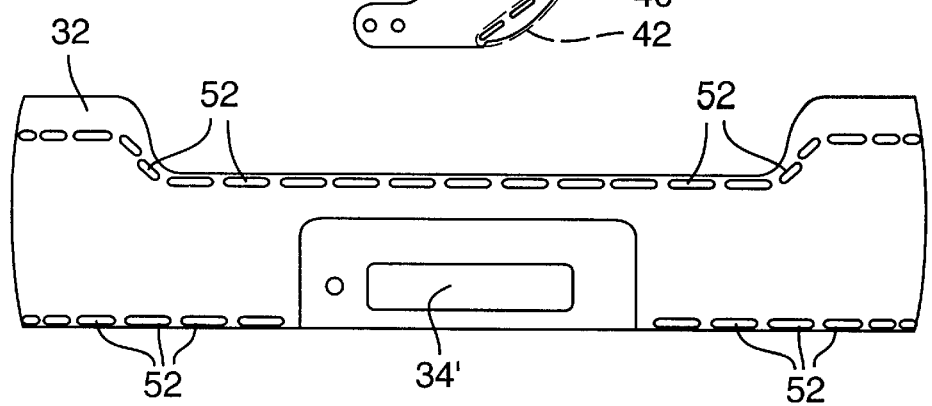

VEHICLE BRUSH AND GRILL GUARD

FIELD OF THE INVENTION

This invention relates to a structure mounted to the front end of a vehicle such as a pickup truck, the structure serving to protect the vehicle's front end when driven off road and through brush and the like, enhances the appearance and optionally provides support and enclosure for a winch.

BACKGROUND OF THE INVENTION

Vehicles having off road capability, i.e., vehicles equipped with optional four-wheel drive and generally described as pickup trucks or sport utility vehicles (SUVs) are often equipped with a winch typically located in the vicinity of the front bumper. The winch can have a variety of uses but a common use is to assist the driver when getting the vehicle unstuck. The cable of the winch is played out and secured to a fixed object such as a tree and then the cable is rewound onto the winch to pull the vehicle out of its stuck condition.

A winch mounted to the front end of these vehicles is both desirable as an accessory and unsightly. Whereas these vehicles are designed to have a smooth flowing appearance that is deemed attractive, the placement of a winch that protrudes in front of the front bumper can be viewed as a blemish on an otherwise attractive vehicle.

Prior attempts at hiding the unattractive protruding winch have included the addition of a brush and grill guard. The guard is an arrangement of tubular members mounted in front of the hood and bumper that visually extends the front end of the vehicle. The winch and carrier is inset into this front end extension and reduces the impression of the winch simply being an add on item.

The brush and grill guard appearance is an improvement over the winch alone but it nevertheless is considered to detract from the vehicle's otherwise attractive appearance. Also, the typical construction of the guard involves the attachment of a side member at each side of the winch carrier. These side members are steel plates that are secured to the vehicle frame and extend forwardly of the bumper to provide a support for the tubular members and the winch carrier. The plates are sufficiently rigid to provide a rigid support for the tubes that extend laterally from the side members and are cooperatively shaped to provide the forwardly spaced guard over the front of the vehicle. Cross bars or tubes may extend between the side members as desired by the vehicle owner.

The appearance is an improvement as previously explained but the forwardly projected steel plates could be menacing. They are the point most likely to strike a post or wall and it is desirable to cover these protruding edges of the steel plates with an elastomer sleeve. Experience has shown, however, that the sleeves are easily torn or otherwise damaged and quickly are rendered unsightly and have to be replaced.

It is, accordingly, an objective of the present invention to provide a brush and grill guard design that adds rather than detracts from the appearance of the vehicle. The design includes the steel plates and provides protective elastomer sleeves or strips for exposed edges but in a manner so as not to be readily damaged. The invention further provides an improvement to the manner of mounting a winch to the brush and grill guard.

BRIEF DESCRIPTION OF THE INVENTION

The brush and grill guard is mounted to steel plates that are secured to the vehicle frame. Securement of the plates must be sufficient to withstand the pulling force to which a winch may be subjected. The plates in effect place side walls at each side of the position for the winch and with the tubular members installed, the winch supported by and firmly anchored to the plates is inset into the guard structure.

The winch which consists of a drum with cable wound thereon and the motor that rotates the drum nevertheless would typically remain substantially fully visible. The present invention provides a fascia that extends between the two side plates to cover the winch. The fascia is compound curved and not only substantially hides the winch but it also give the brush guard a sleek appearance that blends into the overall vehicle appearance. An opening is provided in the front of the fascia and a roller fair lead is mounted over the opening and the winch cable and cable hook extend over the opening and roller fair lead. A fair lead cover easily removable and replaceable covers the opening in the fascia except when the winch is in use.

To resolve the problem of the damage sensitive sleeve on the side plate leading edge, the edge is provided with through holes strategically formed along the edge that is to be covered with a sleeve or strip. An elastomer in the form of urethane is molded onto the edge by Reaction Injected Molding. That is, as the material is molded to the edge, fingers of the material protrude through the holes to substantially integrate the elastomer to the plate.

The improvement provided by the invention will be further appreciated upon reference to the following detailed description having reference to the accompanying drawings.

BRIEF DESCRIPTION OF THE DRAWINGS

FIG. 1 is a view of a brush and grill guard in accordance with the present invention;

FIG. 2 is a view showing the manner of mounting a winch carrier to the brush and grill guard of FIG. 1;

FIGS. 3 and 4 are views further illustrating the mounting arrangement of the winch carrier to the guard of FIG. 1;

FIG. 5 is a view of a side member for the guard of FIG. 1; and

FIG. 6 is a view of a facia member applied to the winch carrier and guard of FIG. 1.

DESCRIPTION OF THE PREFERRED EMBODIMENT

Refer now to FIG. 1 of the drawings which illustrates a vehicle 8 that has a vehicle brush and grill guard assembly 10 mounted on the front end of the vehicle. The assembly 10 is designed to accommodate the design appearance of the vehicle and for receiving a winch 20. In addition to providing mounting structure for the winch 20, the assembly 10 has structure that protects the front end of the vehicle from brush and the like that is likely to be encountered in off-road driving conditions.

Refer now to FIGS. 2, 3 and 4. of the drawings. The guard assembly 10 has frame extensions 12 mounted to the frame 13 of the vehicle 8. A side member 14 is mounted to each of the frame extensions 12 extending upwardly. A carrier plate 16 is mounted between the side members 14 and is arranged to receive a winch 20 (FIG. 1).

Suitable bracing members 18 extend from the frame extensions 12 to the carrier 16. Additional bracing members 17 extend from a cross member 19 of the frame 13 to the side members 14.

Cross members 22 are mounted between the side members 14. In this embodiment two cross members 22 are provided between the side members 14 to add to the structural integrity as well as serve as a portion of the grill guard. From FIG. 1, the grill guard includes curved framework 23 extended outwardly from each of the side members 14. The framework 23 is arranged to blend with the design of the vehicle 8.

An opening 34 (FIG. 2) is provided in the front wall 20 of the carrier 16 (and extends through the fascia 32 (FIG. 1) through opening 34'. The opening is for the deployment of a cable of the winch 20. A fair lead 28 surrounds the opening 34' (FIG. 1) and provides rollers for guiding the cable onto and off of the winch 20.

A facia 32 (FIGS. 1 and 6) is mounted to the side members 14 to cover the front 26 of the carrier 16 and in effect hides the winch 20 from view. The opening 34' is provided in the facia 32 in alignment with the opening 34 of the carrier 16. The facia 32 is configured to blend with the contoured design of the vehicle 8.

A removable cover 36, again designed to blend with the vehicle design, is removably mountable on the fascia 32 (shown as mounted in FIG. 1 but with a cutaway to expose the winch hook and fair lead). The cover 36 when installed on the fascia 32 covers the opening 34' in the fascia 32 and thus the winch 20 and its components are out of view. When it is desired to use the winch 20, the cover 36 is removed allowing access to the cable of the winch 20.

The side members 14 have integrally molded elastomer protective bumper strips 42 as seen in FIG. 1. The strips 42 are secured to the side member 14 by Reaction Injected Molding. The side members 14 have formed slots 40 (FIG. 5) near their edges. During the molding process, the slots 40 become filled with the elastomer material which fixedly secures the strips 42 to the side members. The elastomer material in effect becomes integral with the side members 14. The molding process further provides collars 42' that extend over the tubes and provide a shield over the juncture between the cross members 22 and the side members 14.

The fascia 32 also has bumper strips 50 (FIG. 1) integrally molded to its edges. The strips 50 are secured to the fascia by Reaction Injected Molding. The edge of the fascia has slots 52 (FIG. 6) that become filled with the elastomer material to fixedly secure the strips 50 to the fascia 32.

Important to at least one facet of the invention is the matching of the grill and brush guard, and its various components, to the design of the vehicle. The vehicle as illustrated is structured to have multi-dimensioned curves. The front end is curved top to bottom and side to side. The cross members 22 and frame work 23, the side members 14 and the carrier are all curved in a like manner to cooperatively provide the same visual appearance, i.e., curved top to bottom and side to side. The design of the fascia is similarly curved top to bottom and side to side referred to as a compound curve. Even the cover mounted on the fascia is curved and the overall impression that is projected is a singular design in appearance.

Those skilled in the art will recognize that modifications and variations may be made without departing from the true spirit and scope of the invention. The invention is therefore not to be limited to the embodiments described and illustrated but is to be determined from the appended claims.

The invention claimed is:

1. A vehicle comprising:
    a body portion and a support portion, said body portion defining a front end of the vehicle having a rounded visual appearance;
    a pair of vertical plates each having opposing sides and each mounted to the support portion and protruding forwardly of the front end to define a pair of leading front edges;
    a plurality of tubular members mounted to the vertical plates and collectively forming a brush and grill guard and providing a rounded visual appearance compatible with the rounded visual appearance of the front end of the vehicle;
    said vertical plates each including a metal plate having a metal leading edge portion and an elastomer strip wrapped around the metal leading edge portion from one side of the plate to the other and defining elastomer wrap around sides, said leading edge portion provided with openings and said elastomer strip applied to the edge portion by molding, said molding producing a continuum of elastomer material through the opening and integrally bonded to both wrap around sides of the elastomer strip to produce an integral bond of the elastomer strip to the metal plate.

2. A vehicle as defined in claim 1 wherein the vertical plates are spaced apart and centered on the vehicle front end, and a carrier plate for carrying a winch is positioned between the vertical plates and secured to the vertical plates and thereby secured to the vehicle support portion.

3. A vehicle as defined in claim 2 wherein a winch is mounted on the carrier and a fascia plate is vertically mounted between the leading edges of the vertical plates to cover the winch as mounted on the carrier plate.

4. A vehicle as defined in claim 3 wherein said body portion is rounded in appearance top to bottom and side to side and said fascia plate is formed into a compound curve compatible to said body appearance.

5. A vehicle as defined in claim 4 wherein exposed edge portions of said fascia plate are provided with elastomer strips molded to said edge portions.

6. A vehicle as defined in claim 5 wherein an opening is provided in the fascia plate to expose the winch carried by the carrier plate, a fairlead mounted to said fascia plate and adjacent said opening for guiding a cable end projected from said winch through said opening, and a removable cover removably placed over said opening with the cable end retracted onto the winch.

7. A vehicle as defined in claim 1 wherein the molded strips include a collar portion that receives an end of a tubular member, said collar portion covering a juncture whereat a tubular member is mounted to the vertical plate.

8. A vehicle comprising:
    a vehicle body designed to produce a rounded appearance and a frame, the combination defining a front end of the vehicle;
    a winch carrier mounted to the frame and protruding forwardly of the front end and a winch and cable thereof mounted to the carrier;
    vertical plates mounted to each side of the carrier and a plurality of tubular members mounted to the vertical plates and collectively providing a brush and grill guard in the form of a front end extension with the carrier and winch inset into the front end extension and not projected forward of the front end extension with the winch in a non-operative mode; and
    a fascia extended between the vertical plates and configured to achieve a blending of the front end extension to the rounded appearance of the vehicle body, said fascia positioned to cover the winch without impeding operator use of the winch.

9. A vehicle as defined in claim 8 wherein the fascia is provided with an opening, a fair lead positioned forward of the fascia and a cable end of the cable extended through the opening and through the fair lead for operator use of the winch.

10. A vehicle as defined in claim 9 including a removable and replaceable cover fitted to the opening in the fascia and over the fair lead.

11. A vehicle as defined in claim 10 wherein the cover is provided with a rounded appearance for blending with the design of the vehicle.

12. A vehicle as defined in claim 8 wherein the fascia is configured as a compound curve.

13. A vehicle comprising:

a vehicle body designed to produce a rounded appearance and a frame, the combination defining a front end of the vehicle;

a winch carrier mounted to the frame and protruding forwardly of the front end and a winch and cable thereof mounted to the carrier;

vertical plates mounted to each side of the carrier and a plurality of tubular members mounted to the vertical plates and collectively forming a front end extension with the carrier and winch inset into the front end extension; and said vertical plates each including a metal plate having a forwardly projected edge portion, holes provided through the plate at strategic positions along said edge portion, and an elastomer strip molded to the edge portion and wrapped around the edge portion and overlapping said openings and as molded providing a continuum of elastomer through the openings and integrally bonded to the strip at each side of the edge portion to integrally bond the elastomer strip to the metal plate.

14. A vehicle as defined in claim 13 wherein the elastomer material is urethane and molded to the plate by a process of Reaction Injected Molding.

* * * * *